United States Patent
Doss et al.

[11] Patent Number: 5,838,539
[45] Date of Patent: Nov. 17, 1998

[54] DOCKING MODULE FOR PORTABLE COMPUTERS

[75] Inventors: Jeffrey Doss; Roy Kenneth Fischer; Randall Ronald Toltzman, all of Scottsdale; Christopher Harold Davey, Tempe, all of Ariz.

[73] Assignee: Electronics Accessory Specialists International, Scottsdale, Ariz.

[21] Appl. No.: 555,301

[22] Filed: Nov. 8, 1995

[51] Int. Cl.⁶ .................................. G06F 1/16; H05K 5/02
[52] U.S. Cl. ............................................ 361/686; D14/107
[58] Field of Search ................................. 361/683–686, 361/681, 682; D14/107; 364/708.1; G06F 1/16

[56] References Cited

U.S. PATENT DOCUMENTS

| | | | |
|---|---|---|---|
| D. 335,490 | 5/1993 | Mesfin | D14/107 |
| D. 350,338 | 9/1994 | Meschter | D14/107 |
| D. 354,277 | 1/1995 | Kuzumoto | D14/107 |
| D. 359,034 | 6/1995 | Kondo | D14/107 |
| D. 362,241 | 9/1995 | Youens | D14/107 |
| 2,879,491 | 3/1959 | Shapiro | 339/17 |
| 3,347,979 | 10/1967 | Hoffman | 174/87 |
| 3,842,389 | 10/1974 | Glover | 339/60 |
| 4,002,282 | 1/1977 | Zielinski | 235/156 |
| 4,017,725 | 4/1977 | Roen | 235/152 |
| 4,215,236 | 7/1980 | Reiser | 174/59 |
| 4,377,315 | 3/1983 | Grau | 339/17 R |
| 4,379,336 | 4/1983 | Yamamoto | 364/708 |
| 4,388,671 | 6/1983 | Hall | 361/383 |
| 4,420,209 | 12/1983 | Reis | 339/91 |
| 4,480,835 | 11/1984 | Williams | 273/148 B |
| 4,498,716 | 2/1985 | Ward | 339/17 R |
| 4,507,697 | 3/1985 | Ozil | 361/1 |
| 4,530,066 | 7/1985 | Ohwaki | 364/708 |
| 4,538,867 | 9/1985 | Wilson | 339/17 CF |
| 4,541,036 | 9/1985 | Landries | 361/426 |
| 4,571,456 | 2/1986 | Paulsen | 179/2 C |
| 4,605,275 | 8/1986 | Pavel | 339/119 R |
| 4,634,203 | 1/1987 | Noyes | 339/91 R |
| 4,653,835 | 3/1987 | Schulte | 339/128 |
| 4,659,159 | 4/1987 | Takahashi | 339/75 M |
| 4,659,166 | 4/1987 | Morningstar | 338/177 R |
| 4,669,053 | 5/1987 | Krenz | 364/708 |
| 4,680,674 | 7/1987 | Moore | 361/395 |
| 4,717,982 | 1/1988 | Toreson | 360/137 |
| 4,725,244 | 2/1988 | Chewning | 439/296 |
| 4,726,783 | 2/1988 | Nakazawa | 439/350 |
| 4,734,874 | 3/1988 | Hwang | 364/708 |
| 4,769,764 | 9/1988 | Levanon | 364/708 |
| 4,788,658 | 11/1988 | Hanebuth | 364/900 |
| 4,810,203 | 3/1989 | Komatsu | 439/326 |
| 4,870,702 | 9/1989 | Azzouni | 455/346 |
| 4,888,549 | 12/1989 | Wilson | 324/73 R |
| 4,894,792 | 1/1990 | Mitchell | 364/708 |
| 4,907,977 | 3/1990 | Porter | 439/74 |
| 4,915,643 | 4/1990 | Samejima | 439/357 |
| 4,937,563 | 6/1990 | Shekita | 340/700 |
| 4,939,622 | 7/1990 | Weiss | 361/391 |

(List continued on next page.)

*Primary Examiner*—Lynn D. Feild
*Attorney, Agent, or Firm*—Thomas L. Adams

[57] ABSTRACT

A docking module can electrically connect a portable computer to a plurality of ancillary support devices. Engagement devices can alternately pull and push the portable computer relative to the housing. A sliding deck projects from the housing and is adapted to underlie and pull the portable computer toward the housing. The module has a plurality of electrically interconnected connectors mounted on panels on opposite sides of a housing. These panels are separately mounted at front and rear openings in the housing. A standard blank panel can have holes formed in it in a variety connector patterns to accommodate a variety of portable computers. Accordingly, the module is readily adapted to a portable computer by selecting a mounting pattern for the connectors on one of the panels, without a need to modify the housing. Also the docking module can be customized by using a standard reciprocating mechanism and selecting a customized mating implement to attach to the reciprocating mechanism.

47 Claims, 3 Drawing Sheets

5,838,539
Page 2

U.S. PATENT DOCUMENTS

| | | | |
|---|---|---|---|
| 4,941,841 | 7/1990 | Darden | 439/377 |
| 4,972,298 | 11/1990 | Casa | 361/429 |
| 4,991,058 | 2/1991 | Watkins | 361/391 |
| 5,027,257 | 6/1991 | Lockwood | 361/428 |
| 5,030,128 | 7/1991 | Herron | 439/372 |
| 5,035,627 | 7/1991 | Burnett | 439/64 |
| 5,053,199 | 10/1991 | Keiser | 422/68.1 |
| 5,055,067 | 10/1991 | Field | 439/540 |
| 5,136,468 | 8/1992 | Wong | 361/393 |
| 5,186,646 | 2/1993 | Pederson | 439/374 |
| 5,313,596 | 5/1994 | Swindler | 395/325 |
| 5,347,425 | 9/1994 | Herron | 361/683 |
| 5,384,686 | 1/1995 | Mesfin | 361/686 |
| 5,396,400 | 3/1995 | Register | 361/686 |
| 5,402,310 | 3/1995 | Penniman | 361/686 |
| 5,408,382 | 4/1995 | Schultz | 361/686 |
| 5,436,792 | 7/1995 | Leman | 361/686 |
| 5,450,271 | 9/1995 | Fukushima | 361/686 |
| 5,452,180 | 9/1995 | Register | 361/686 |
| 5,459,637 | 10/1995 | Ma | 361/686 |
| 5,477,415 | 12/1995 | Mitcham et al. | 361/686 |
| 5,535,093 | 7/1996 | Noguchi et al. | 361/686 |
| 5,557,562 | 9/1996 | Yoshiharu et al. | 364/708.1 |
| 5,568,359 | 10/1996 | Cavello et al. | 361/686 |
| 5,619,397 | 4/1997 | Honda et al. | 361/686 |

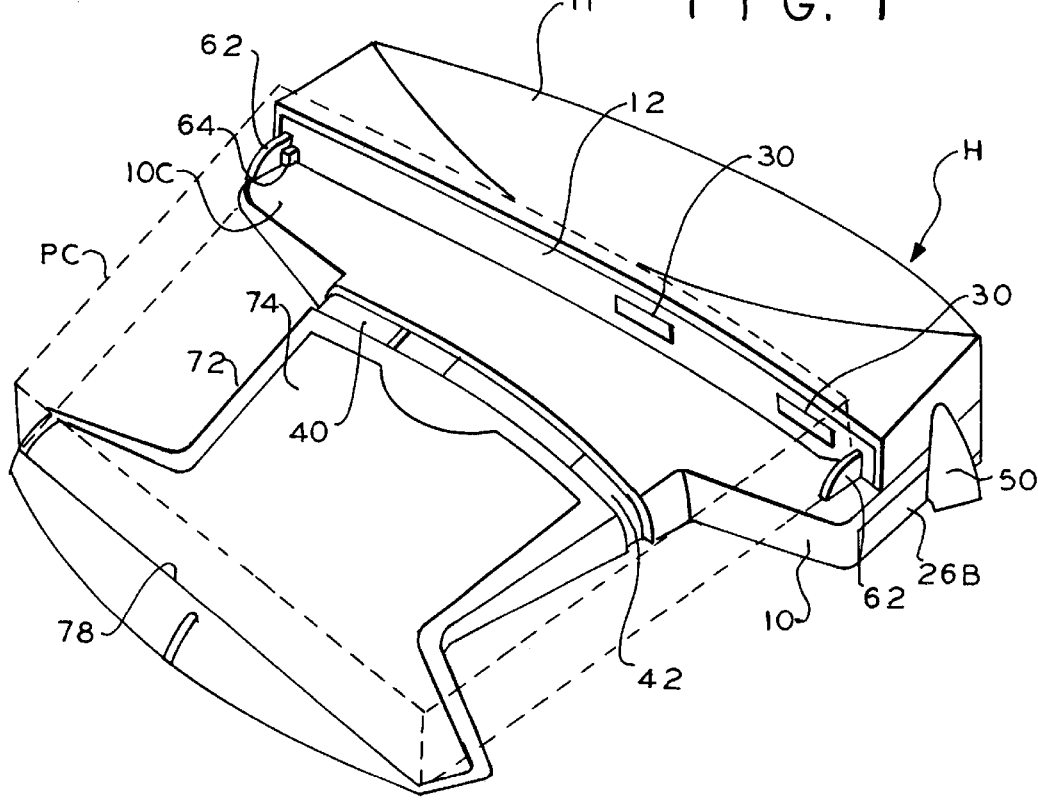
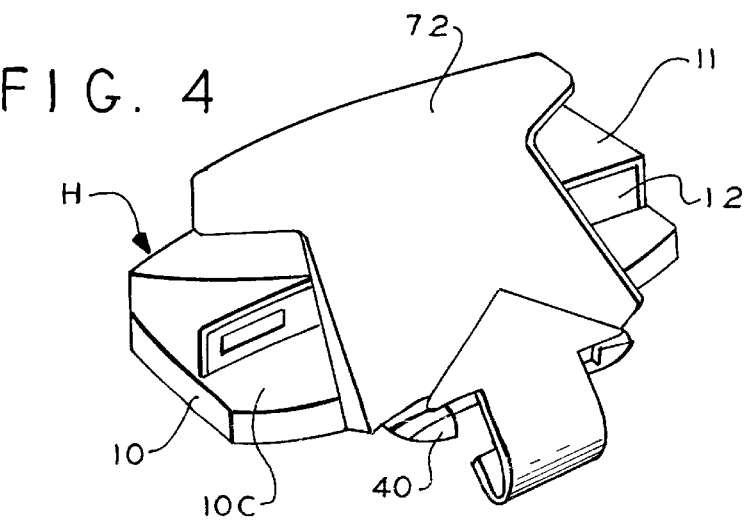

DOCKING MODULE FOR PORTABLE COMPUTERS

BACKGROUND OF THE INVENTION

1. Field of the Invention

The present invention relates to devices that connect a portable computer to ancillary support devices, and in particular, to docking devices having a plurality of electrically interconnected connectors mounted on opposite sides of a housing.

2. Description of Related Art

Electronic equipment has often been housed in rack mountable cases. These cases have rear connectors that mate with connectors on the rack, to connect the electronics in the case to a larger system.

Various mechanisms are employed for securing the case to the electronic rack. U.S. Pat. No. 4,939,622 shows a general type of rack mounting. In U.S. Pat. No. 4,659,159 a specialized tray has a connector that mates with a connector at the rear of a portable video recorder.

Portable or lap top computers have become popular for personal computing while traveling or for field use. When the user brings the portable computer to a central office, the portable computer is often connected to a local area network and other peripheral devices. The ancillary support devices can include in addition to the local area network, additional drives (hard drives, floppy disk, CD ROM), printers, a CRT display, various multimedia devices, etc. A difficulty with connecting a portable computer to such ancillary support devices is the large amount of time taken to connect these diverse devices and to match the appropriate connector with a connector at the back of the portable computer.

U.S. Pat. No. 5,030,128 shows a docking module having a plurality of connectors arranged in a pattern to mate with connectors at the rear of a portable computer. This docking module has a toggle latch for pulling the portable computer onto the module, but lacks a device for pushing the portable computer away from the module. Also, there is no underlying support for guiding the portable computer into the docking module. Thus connecting and disconnecting the portable computer can be difficult. Also the panel on the docking module supporting the connectors that mate with the portable computer appear to be molded or have a relatively complex structure that is not easily manufactured. Thus designs of this type are not easily adapted to a variety of portable computers. See also, U.S. Pat. Nos. 4,769,764; 4,788,658; and 5,186,646.

Various transportable computers that can be adapted with a number of modules are shown in U.S. Pat. Nos. 4,530,066; 4,669,053; and 4,680,674.

Accordingly, there is a need for an improved docking module that allows a portable computer to be easily connected and disconnected and can be easily customized to handle a variety of portable computers.

SUMMARY OF THE INVENTION

In accordance with the illustrative embodiments demonstrating features and advantages of the present invention, there is provided a docking module for electrically connecting a portable computer to a plurality of ancillary support devices. The docking module has a housing and a plurality of electrically interconnected connectors mounted on opposite sides of the housing. The module also has an engagement means for alternatively pulling and pushing the portable computer relative to the housing.

According to a second aspect of the present invention the foregoing docking module has in place of the engagement means, a subjacent means. The subjacent means projects from the housing and is adapted to underlie and pull the portable computer toward the housing.

According to a third aspect of the present invention another docking module can electrically connect a portable computer to a plurality of ancillary support devices. The docking module has a spaced pair of panels and a plurality of electrically interconnected connectors mounted on opposite ones of the panels. The module also has a housing with a front and a rear opening. The panels are separately mounted at the front and rear openings. Thus, the module is readily adapted to the portable computer by selecting a mounting pattern for the connectors on at least one of the panels, without modifying the housing.

According to a related method of the present invention, standard panels and standard housings are used for customizing a docking module. This docking module has a plurality of electrically interconnected connectors for electrically connecting a plurality of ancillary support devices to any one of a variety of portable computers having a variety of connector patterns. The method includes the step of forming holes in a chosen one of the standard panels to register with a first one of the connector patterns. Another step is mounting the chosen one of the panels and a first group of the connectors at one of the standard housings, with the connectors mounted at the holes. The method also includes the step of forming holes in another one of the standard panels to register with a different one of the connector patterns. Another step is mounting the other one of the panels and a second group of the connectors at another one of the standard housings, with the connectors mounted at the holes.

Another method according to another aspect of the present invention, employs standard reciprocating mechanisms at a standard housing, for customizing a docking module. This docking module has a plurality of electrically interconnected connectors for electrically connecting a plurality of ancillary support devices to any one of a variety of portable computers having a variety of casing shapes. The method includes the step of selecting a mating implement for connecting with one of the casing shapes and mounting the mating implement at one of the mechanisms for reciprocation thereby. Another step is selecting a different implement for connecting with a different one of the casing shapes. The method further includes the step of mounting the different implement at another one of the mechanisms for reciprocation thereby.

By employing apparatus and methods of the foregoing types, improved docking is achieved to facilitate the electrically connection of a portable computer to ancillary support devices. In a preferred embodiment, the module housing is formed from two complementary molded shells, specifically, a molded base unit that mates with a cover to form a front and a rear opening.

Preferably, a pair of flat metal plates are mounted in grooves between the cover and base unit at the front and rear openings. By employing metal plates of this type, a connector pattern can be readily formed by punching or cutting holes in a pattern determined by a CNC machine. Thus, the metal plates can be stamped in a standard form and then customized in a simple, automated manner.

After holes are formed in the panels in this fashion, electrically connected pairs of connectors can be mounted between the two panels. In some instances, a spacer will extend a connector off the panel to enable connection to a recessed socket in certain varieties of portable computers.

The preferred embodiment can also include a metal base plate with a floor having upright wings that form side walls. These side walls can be machined in a similar fashion to provide a site for optional connectors.

Also in this preferred embodiment, the front plate facing the portable computer can have additional openings through which various implements can reciprocate. These implements may include a stud to push the portable computer out of engagement with the docking module. A guide wall can be integrated with the pushing studs to facilitate engagement of the portable computer with the docking module. Alternatively, a hook-like catch can reciprocate through the front panel and mate with a hole in the underside of the portable computer. Thus the portable computer can be held by this catch and can be pulled inward to connect with the docking module.

Preferably, the implements can be detachably secured by screws or other means to a reciprocating, transverse bar inside the module housing. The transverse bar can extend across the width of the module to enable the implements to reach opposite sides of the portable computer. By using screws or the like, alternative implements can be selected, to customize the module for specific portable computers.

In one preferred embodiment, the transverse bar is reciprocated by a cam plate driven by an integral radial arm that extends through an opening on the side of the docking module. This arm can be manipulated to manually reciprocate the transverse bar and the implements that project through the front plate of the docking module.

Also in this preferred embodiment, the cam plate can have an additional camming surface to drive a sliding deck that serves as a platform on which the portable computer can rest. The sliding deck can have an outer rail that keeps the portable computer on the deck. Alternatively, the sliding deck can have studs that engage recesses in the portable computer. In any event, the sliding deck can be reciprocated by manipulating the radial arm connected to the cam plate. Thus the sliding deck can pull the portable computer in and readily connect it to connectors on the docking module. In one preferred embodiment, the sliding deck can be hinged to fold up and free desk top area when the docking module is not in use.

BRIEF DESCRIPTION OF THE DRAWINGS

The above brief description as well as other objects, features and advantages of the present invention will be more fully appreciated by reference to the following detailed description of presently preferred, but nonetheless illustrative embodiments in accordance with the present invention, when taken in conjunction with the accompanying drawings, wherein:

FIG. 1 is a perspective view of a docking module having a sliding deck in accordance with principles of the present invention;

FIG. 4 is a perspective view of the docking module of FIG. 1 with the sliding deck extended and folded up to reduce the area occupied by the module.

DETAILED DESCRIPTION OF THE PREFERRED EMBODIMENTS

Figure 2:
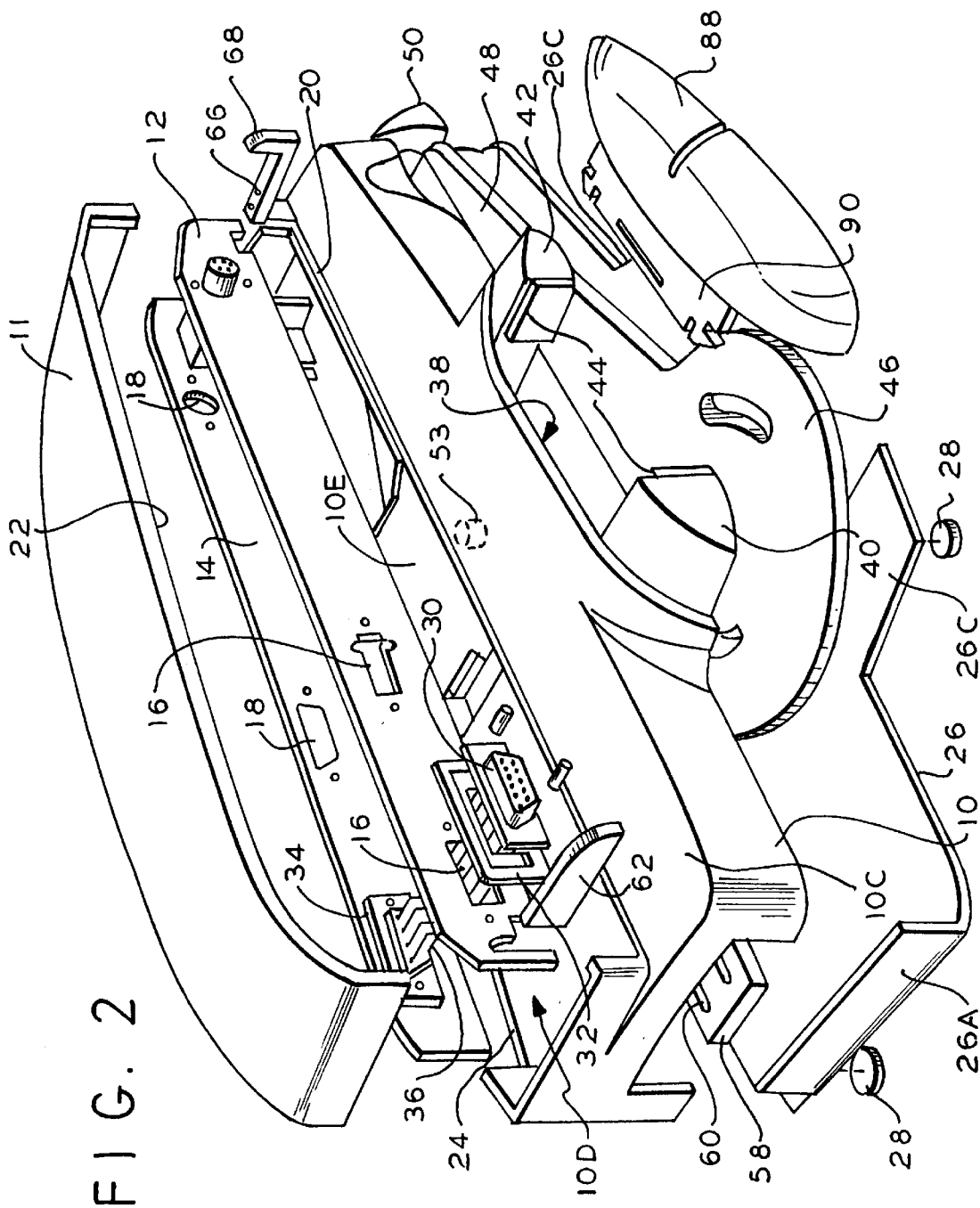
FIG. 2 is a perspective, exploded view of the docking module of FIG. 1, but modified to eliminate the sliding deck.
Figure 3:
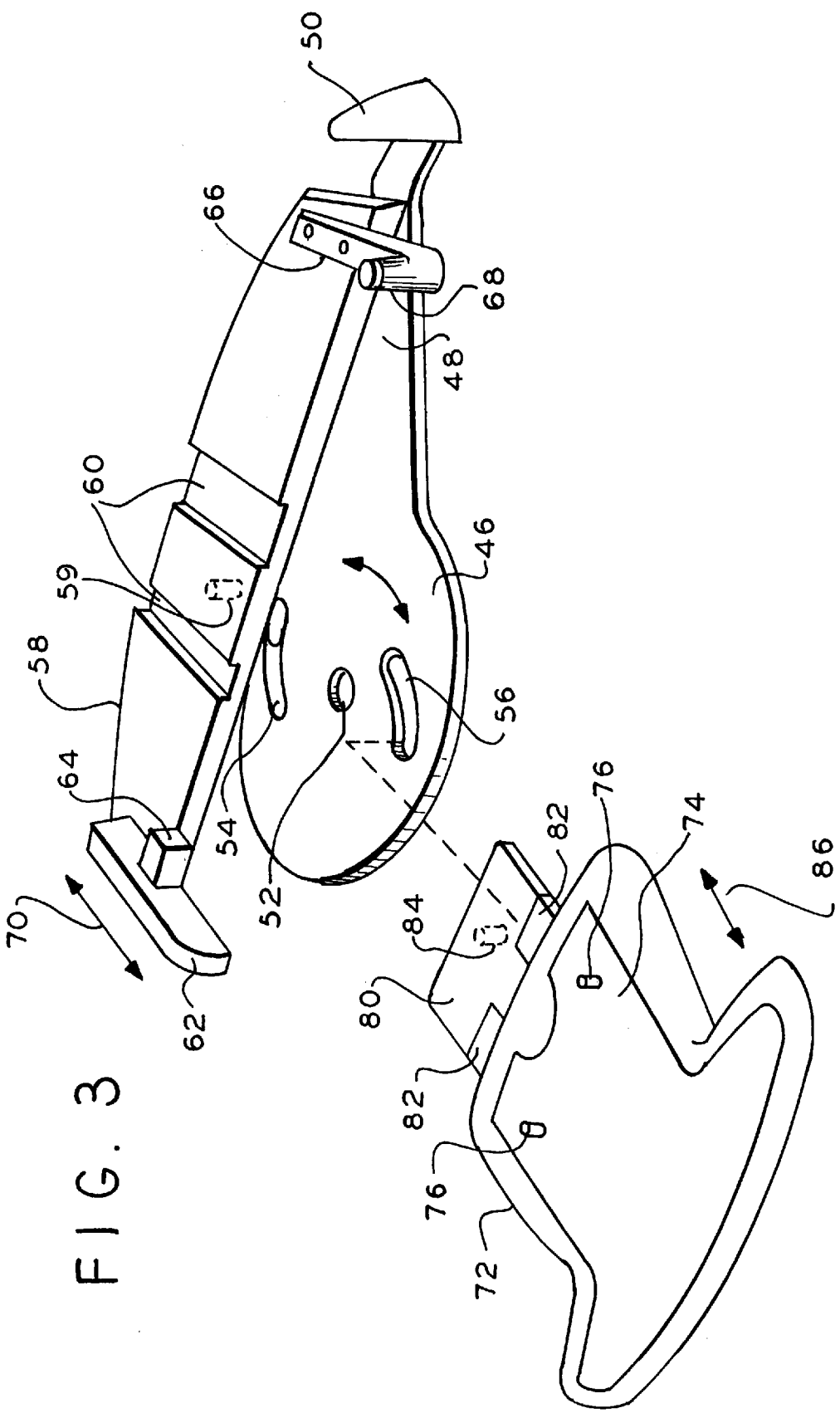
FIG. 3 is an exploded view of some of the components used with the docking module of FIG. 1.

Referring to FIGS. 1, 2 and 3, a docking module is shown having a housing H, including a pair of complementary shells, shown herein as a base unit 10 and cover 11. Base unit 10 provides a hollow, generally rectangular casing. Unit 10 has a rear portion adapted to receive cover 11 and a forward portion providing a shelf region 10C for guiding the portable computer PC, shown in phantom in FIG. 1. The rear section of base unit 10 has an upper opening 10D spanned by bridge 10E, a plate-like structure at about the same elevation as shelf 10C. Shells 10 and 11 may be molded from plastic and dimensioned to allow mating with a portable or lap top computer.

Shells 10 and 11 are shaped to have a front and rear openings designed to hold a front panel 12 and a rear panel 14. Panels 12 and 14 are formed from standard steel or aluminum plates that may be stamped and later modified to have a plurality of holes such as holes 16 and 18. These holes can be machined or punched, preferably by a computerized, numerically controlled machine. The holes on the front panel 12 provide a connector pattern designed to mate with complementary connectors (not shown) at the rear of portable computer PC.

Panels 12 and 14 fit in peripheral grooves at the front and rear opening of shells 10 and 11. The grooves for holding the front panel are shown herein as grooves 20 and 22. The rear panel 14 has similar grooves, such as groove 24 in base unit 10.

The underside of base unit 10 is covered by a stamped base 26, preferably made from an aluminum plate. The ends of base 26 are turned up to form a side walls 26A and 26B on the right and left side of base 26. The side walls of base unit 10 have openings to receive the side walls 26A and 26B of base 26. Rubber feet 28 can be adhered to the underside of base 26.

The holes 16 and 18 in panels 12 and 14 are fitted with a plurality of electrically interconnected connectors. For example, connector 30 may be mounted over a spacer 32 at one of the holes 16 in front panel 12. Connector 30 is shown interconnected by wires 36 to a complementary connector 34, which is mounted on the rear panel 14. Wires 36 may be part of a ribbon cable that is preassembled to the connectors 30 and 34 before they are mounted on the panels 12 and 14.

Instead of wired connections between the front and rear connectors, in some embodiments connection may be made by a printed circuit board mounted between the front and rear connectors. Also, the front and rear connectors need not correspond in a one to one relationship and in some embodiments pins of one or more connectors can connect to pins of one or more other connectors on the rear.

The front wall of base unit 10 in front of shelf 10C is open at front portal 38. A pair of stubs 40 and 42 project outwardly from the front of base unit 10 to flank the front portal 38. Stubs 40 and 42 are pie-shaped prisms with embossments forming ledges 44. The front edge of base 26 has a pair of tongues 26C designed to cover the open undersides of stubs 40 and 42.

A drive mechanism is shown herein as a cam 46 operating as a reciprocating mechanism. Cam 46 is essentially a circular plate made preferably of stamped aluminum, although in some instances molded plastic or other materials can be used instead. Cam 46 has a radially extending arm 48, that projects through a slot in side wall 26B of FIG. 1. The distal end of arm 48 is fitted with a molded plastic handle 50 to facilitate manipulation of manually operable arm 48.

Cam 46 has a center hole 52 (FIG. 3) that is secured to a dependent stud 53 (FIG. 2) projecting downwardly from the underside of deck 10C. Cam 46 may be secured to stud 53 by a screw or other appropriate fasteners to allow cam 46 to rotate about the axis of stud 53.

Cam 46 has a pair of complementary slots 54 and 56 with a radial spacing from hole 52 that varies along the length of the slots 54 and 56 to provide camming surfaces, although reciprocation can be obtained otherwise. For example, the illustrated cam can be mounted in various planes and have camming surfaces that are on the outside edge. Alternative reciprocating mechanisms can be employed using cranks, worm gears, levers, or active elements such as electromagnets and various motors, etc. Also the length of travel caused by the reciprocating mechanism can vary depending upon the portable computer or the need for clearance. Moreover, a manual knob for operating the reciprocating mechanism can project from any face of the housing in any direction to accommodate the mechanism type.

Transverse member 58 is slidably mounted in base unit 10 between the bridge 10E and cam 46. Member 58 has a pair of upper grooves 60 that mate with tongues or ridges on the underside of bridge 10E, to form a tongue and groove joint. Therefore, transverse member 58 can slide transversely in a direction parallel to the slots 60. The underside of transverse member 58 has a driven pin 59 designed to fit into slot 54. Thus, rotational reciprocation of cam 46 causes pin 59 to reciprocate, so that transverse bar 58 reciprocates in the direction indicated by arrow 70.

The ends of transverse member 58 have a pair of slotted screw holes 60 (FIG. 2), for attaching to the ends of member 58 various mating implements (also referred to as engagement means). Member 58 is designed to hold a variety of implements. One such implement shown on the left end of member 58 is a molded unit having a guide wall 62 with a blunted nose integrally connected to an ejection stud 64, which is located centrally on the inside vertical face of guide wall 62. Guide wall 62 is designed to center the portable computer PC from right to left relative to the docking module. As explained hereinafter, ejection stud 64 can move outwardly to push and disconnect the portable computer from the docking module.

Embodiments employing the implement having a guide wall 62 and integral stud 64, will normally have a complementary implement on the opposite end of member 58. Such an arrangement is shown in FIG. 1. The complimentary members will be mirror images. Specifically, the complementary members will have the same guide wall, but the ejection stud will be on the inside face.

In other embodiments, the opposite ends of transverse member 58 may both have the mating implement 66 shown in FIG. 2 and 3 on the right end of member 58. Element 66 is shown as a horizontally disposed bar with a distal catch 68. This element is generally L-shaped. Catch 68 is designed to fit into matching holes on the underside of the portable computer. Catch 68 can therefore both push and pull the portable computer PC relative to the housing H.

A subjacent means is shown herein as a sliding deck 72. Deck 72 is a plate-like member with a shape somewhat reminiscent of a whale's tale. Deck 72 is molded in plastic and has an aluminum sheet metal inset 74 to form a hollow sandwiched assembly. In FIG. 3, overlay 74 is fitted with an optional pair of studs 76 designed to engage the underside of a portable computer having mating holes.

In FIG. 1, deck 72 lacks studs but is fitted on its distal end with an outer rail 78. Rail 78 is useful where the portable computer PC does not have any mating holes. Thus rail 78 will simply engage the front corner of portable computer PC and hold it in engagement with the connectors on the housing H of the docking module. Because portable computer PC of FIG. 1 presumably lacks mating holes, previously mentioned guide walls 62 are employed without any catches or other implements to fit into holes in the portable computer. Therefore, the portable computer PC of FIG. 1 is held in place not by catches or studs that engage holes in the portable computer, but by the bearing surface provided by outer rail 78.

Referring to FIG. 3, deck 72 is shown separated from its driving mechanism and having hinged to its rear edge a hinge member 80. Hinge member 80 fits between two rear tabs 82 molded into the back edge of deck 72. The underside of hinge member 80 has a dependent pin 84 that projects into the slot 56 of cam 46. Thus rotational reciprocation of cam 46 will cause deck 72 to reciprocate in the direction indicated by double headed arrow 86.

Slots 54 and 56 are graded to cause transverse member 58 and deck 72 to reciprocate synchronously in the same direction. Thus elements 58 and 72 will extend and retract synchronously.

When deck 72 is extended outwardly there is clearance between the inside end of the deck and the deck 10C, and deck 72 is free to swing upwardly to the stored position shown in FIG. 4. This reduces the amount of area occupied by the docking module.

An important advantage of the apparatus just described is the ability to customize the module to handle various portable computers without making expensive changes to molds and the like. For example, panels 12 and 14 can be stamped by a standard die to create the illustrated overall outline.

Thereafter, a computerized, numerically controlled machine can be used to form the various other holes in the panels. For example, a numerically controlled machine can have a limited number of dies that are designed to punch out the holes that will typically be required to accept the various connectors employed with portable computers. The number of connector types is relatively limited and their shapes are well defined.

Thus, a numerically controlled machine can have a turret with a limited number of dies. The machine can be programmed to position one or more of these dies at programmed positions over panel 12 or 14, and then automatically operated to punch out the desired holes. Therefore, the layout of holes required for various connector patterns on panels 12 and 14 can be readily customized by reprogramming the numerically controlled machine, as opposed to the relatively expensive procedure of fabricating a new, specialized die (or by the highly expensive technique of machining the plate by hand).

The machine can, not only punch holes for the connectors, but can also punch or drill holes needed for attachment screws. Similarly, holes of various sizes and shapes can be formed to provide clearance for the implements that must project through plate 12, such as implements 62 or 66. In a similar fashion, a numerically controlled machine can provide a variety of holes for connectors or other devices that are to be mounted in side walls 26A and 26B of base 26.

Accordingly, implements, such as implements 62 and 66, that engage the portable computer PC can be selected to customize the module. Therefore, by fabricating a limited number of implements, the module can be customized to engage the specific surfaces of a variety of portable computers. The relatively small, simple structure associated with the implements such as implements 62 and 66 are easily molded with relatively low cost. Moreover, relatively inexpensive, small plastic implements can be readily and economically produced to provide a quick manufacturing capability for various customized docking modules.

Regardless, most portable computers will work satisfactorily with the guide wall 62 and its integral ejection stud 64. The lateral position of the side wall 62 can be readily adjusted by changing the position of the clearance hole in panels 12. This lateral adjustment is accommodated by the screw slot 60 in transverse member 58. Likewise, most portable computers will be accommodated by the outer rail 78.

The varying depths of portable computers can be accommodated: by either stocking rails of varying thicknesses; by attaching spacers to rail 78; or by adjusting the position of rail 78 on the deck 72. In the latter instance, rail 78 can be secured at any one of a number of mounting holes or can be secured by screws in screw slots similar to slots 60 illustrated for transverse member 58.

In some instances, the docking module may use an implement such as element 66 (FIG. 2) with its integral catch 68. This implement 66 is able to both push and pull the portable computer. Thus deck 72 of FIG. 1 may not be needed for such a docking module. In this case, the deck can be eliminated and the front portal 38 and stubs 40 and 42 are covered by a nose cover 88 shown in FIG. 2. Cap 88 is a plastic molded element with an integral, inwardly directed snap tab 90 designed to snap into position over the stubs 40 and 42 by mating with the base unit 10.

Instead of a folding deck, some embodiments may include a subjacent support having a different shape. Alternatively, the deck may be made from a plurality of separate elements that may either detach, retract, or fold backwards azimuthally. In some embodiments, the sliding deck may have side rails to center the portable computer from moving in a right to left direction. In other embodiments the sliding deck may be stored by retracting underneath the housing.

While a pair of implements is shown mounted on a common transverse bar, in other embodiments the implements may be linked otherwise. Also in some embodiments these implements may be positioned otherwise than at the outside edge of the portable computer. Some implements may extend from the front face of the housing along the sides of the portable computer to grip the opposite end of the portable computer. Some implements mounted on the transverse bar may be composed of a plurality of segments that are connected together by screws, glue or other fastening means to provide additional adaptability in fabricating various types of implements.

In operation, the unit illustrated in FIG. 1 can be operated by first pushing handle 50 back to extend deck 72 and guides 62. Essentially, cam 46 (FIG. 3) rotates counter clockwise to cause slot 56 to push pin 84 out, thereby extending hinge member 80 and deck 72. This provides clearance in order to place portable computer PC atop the deck 72. Thereafter, when handle 50 is pulled forward, deck 72 and rail 78 retract, thereby pulling the portable computer PC into engagement with the connectors 30 on the panel 12. Essentially, cam 46 (FIG. 3) rotates clockwise to retract pin 84, thereby retracting hinge member 80 and deck 72. Guide walls 62 extend alongside portable computer PC to guide it into mating alignment with connectors 30.

Various ancillary support devices may be kept connected to connectors 34 on back panel 14 of the docking module. The devices are those commonly used to support a portable computer and can include in addition to a local area network, additional drives (hard drives, floppy disk, CD ROM), printers, a CRT display, various multimedia devices, etc.

The user can later disconnect the portable computer PC by pushing handle 50 back. Cam 46 (FIG. 3) rotates counter-clockwise to cause slot 56 to extend pin 84, thereby extending hinge member 80 and deck 72. This causes deck 72 and rail 78 to give portable computer PC clearance. Simultaneously, guide walls 62 extend which causes ejection stud 64 to press against the back face of portable computer PC to disconnect it from connectors 30. Walls 62 and studs 64 extend in response to slot 54 of cam 56 extending pin 59 and transverse member 58.

In embodiments employing the implement 66, the operation is similar except that the portable computer is laid atop the element 66 on shelf 10C to allow the catch 68 to engage holes on the underside of the computer. Thereafter, handle 50 is pulled forward to allow catch 68 to retract and to pull the portable computer inwardly and to connect it to connectors 30 on panel 12 of the docking module. After use, the portable computer PC can be removed by pushing handle 50 back which causes catches 68 to extend and thereby disconnect the portable computer.

It is to be appreciated that various modifications may be implemented with respect to the above described preferred embodiments. Instead of a horizontally disposed seam in the housing, some embodiments may have a seam that runs vertically. Alternatively, the housing can be molded as a single unit having an open front and back that are covered with panels that are stamped and machined to provide mounting holes for the various connectors. Additionally, the various dimensions and proportions of dimensions of the housing can be altered depending upon the desired space requirements, rigidity, etc. Also, the various components can, if desired, be made of plastics, metals, ceramics, etc. Furthermore, the housing can have a rectilinear shape or may have various curved surfaces with embossments or indentations to provide easy manipulation or for decorative purposes.

Obviously, many modifications and variations of the present invention are possible in light of the above teachings. It is therefore to be understood that within the scope of the appended claims, the invention may be practiced otherwise than as specifically described.

We claim:

1. A docking module for electrically connecting a portable computer to a plurality of ancillary support devices, comprising:

a housing;

a plurality of electrically interconnected connectors mounted on opposite sides of said housing; and engagement means for alternatively pulling and pushing said portable computer relative to said housing, said engagement means having a spaced pair of retractable implements, said retractable implements being operable while retracting to straddle and laterally position said portable computer, said engagement means including a transverse member mounted to reciprocate in said housing, said spaced pair of implements being mounted on opposite ends of said transverse member and being positioned and sized to project through said housing in order to engage said portable computer.

2. A docking module according to claim 1 wherein said transverse member is slidably mounted in said housing with a tongue and groove joint.

3. A docking module according to claim 1 wherein said implements are detachably secured to said transverse member.

4. A docking module according to claim 3 wherein said implements comprise:

a pair of guide walls for straddling said portable computer, each of said guide walls having an ejection stud positioned to rearwardly abut the portable computer.

5. A docking module according to claim 3 wherein each of said implements comprises:
a bar with a distal catch for hooking into the portable computer.

6. A docking module according to claim 2 wherein said engagement means comprises:
a cam rotatably mounted in said housing for reciprocating said transverse member.

7. A docking module according to claim 6 wherein said cam has a manually operable arm projecting outwardly through said housing.

8. A docking module according to claim 1 wherein said engagement means comprises:
subjacent means projecting from said housing and adapted to underlie and pull said portable computer toward said housing.

9. A docking module according to claim 1 wherein said engagement means comprises:
a transverse member mounted to reciprocate in said housing:
a spaced pair of implements mounted on opposite ends of said transverse member and positioned and sized to project through said housing in order to push said portable computer; and
subjacent means projecting from said housing and adapted to underlie and pull said portable computer toward said housing.

10. A docking module according to claim 9 wherein said engagement means comprises:
drive means coupled to said implements and said subjacent means for reciprocating said implements and said subjacent means.

11. A docking module according to claim 10 wherein said subjacent means comprises:
a sliding deck adapted to underlie and engage said portable computer.

12. A docking module according to claim 11 wherein said sliding deck comprises:
an outer rail for holding said portable computer.

13. A docking module according to claim 11 wherein said sliding deck comprises:
a stud for engaging said portable computer.

14. A docking module according to claim 11 wherein said housing has a front portal, said sliding deck connecting through said front portal to said drive means.

15. A docking module according to claim 14 wherein said drive means comprises:
a hinge member hinged to said sliding deck to allow said deck to swing upwardly in the absence of said portable computer to reduce area occupied by said module.

16. A docking module according to claim 10 wherein said drive means comprises:
a cam rotatably mounted in said housing for reciprocating said transverse member.

17. A docking module according to claim 16 wherein said cam has a spaced pair of camming surfaces one for reciprocating said subjacent means, the other for reciprocating said implements.

18. A docking module according to claim 17 wherein said cam has a manually operable arm projecting outwardly through said housing.

19. A docking module according to claim 16 wherein said cam has an angularly spaced pair of camming slots.

20. A docking module for electrically connecting a portable computer to a plurality of ancillary support devices, comprising:

a housing;
a plurality of electrically interconnected connectors mounted on opposite sides of said housing; and
engagement means for alternatively pulling and pushing said portable computer relative to said housing, and including:
(a) a transverse member mounted to reciprocate in said housing; and
(b) a spaced pair of implements mounted on opposite ends of said transverse member and positioned and sized to project through said housing in order to engage said portable computer, said implements having a pair of guide walls for straddling said portable computer, each of said guide walls having an ejection stud positioned to rearwardly abut the portable computer, said implements being detachably secured to said transverse member.

21. A docking module for electrically connecting a portable computer to a plurality of ancillary support devices, comprising:
a housing having a front and a rear opening;
a plurality of electrically interconnected connectors mounted on opposite sides of said housing:
a pair of panels separately mounted at the front and rear openings, so that said module is readily adapted to the portable computer by selecting a mounting pattern for the connectors on at least one of said panels without modifying said housing; and
engagement means for alternatively pulling and pushing said portable computer relative to said housing said engagement means having a pair of retractable implements, said retractable implements being operable while retracting to straddle and laterally position said portable computer.

22. A docking module according to claim 21 wherein said engagement means comprises:
a transverse member mounted to reciprocate in said housing; and
a spaced pair of implements mounted on opposite ends of said transverse member and positioned and sized to project through said housing in order to engage said portable computer.

23. A docking module according to claim 21 wherein said engagement means comprises:
subjacent means projecting from said housing and adapted to underlie and pull said portable computer toward said housing.

24. A docking module according to claim 23 wherein said housing comprises:
a pair of complementary shells embracing said panels.

25. A docking module according to claim 24 wherein said panels have a plurality of holes, said connectors being mounted in registry with said holes, said module comprising:
at least one spacer mounted in registry with one of said holes between one of said panels and a prominent one of said connectors, so that connections can be made in recesses of the portable computer.

26. A docking module according to claim 23 wherein said panels each comprise:
a plate bored with a plurality of holes, said connectors being mounted in registry with said holes.

27. A docking module according to claim 21 wherein said housing comprises:
a stamped base with at least one side wall.

28. A docking module for electrically connecting a portable computer to a plurality of ancillary support devices, comprising:
- a housing;
- a plurality of electrically interconnected connectors mounted on opposite sides of said housing;
- subjacent means projecting from said housing and adapted to underlie and pull said portable computer toward said housing;
- a transverse member mounted to reciprocate in said housing: and a spaced pair of implements mounted on opposite ends of said transverse member and positioned and sized to project through said housing in order to engage said portable computer.

29. A docking module according to claim 28 wherein said subjacent means comprises:
- a sliding deck adapted to underlie and engage said portable computer; and
- drive means for reciprocating said sliding deck.

30. A docking module according to claim 29 wherein said sliding deck comprises:
- an outer rail for holding said portable computer.

31. A docking module according to claim 29 wherein said sliding deck comprises:
- a stud for engaging said portable computer.

32. A docking module according to claim 29 wherein said housing has a front portal, said sliding deck connecting through said front portal to said drive means.

33. A docking module according to claim 32 wherein said housing comprises:
- a spaced pair of stubs projecting from opposite sides of said front portal for guiding said sliding deck.

34. A docking module according to claim 32 wherein said drive means comprises:
- a hinge member hinged to said sliding deck to allow said deck to swing upwardly in the absence of said portable computer to reduce area occupied by said module.

35. A docking module according to claim 34 wherein said housing comprises:
- a spaced pair of stubs projecting from opposite sides of said front portal each having a ledge for guiding said hinge member, said sliding deck having a rear cowl sized to slidably overlie said stubs.

36. A docking module according to claim 28 wherein said housing comprises:
- a stamped base with at least one side wall.

37. A docking module for electrically connecting a portable computer to a plurality of ancillary support devices, comprising:
- a spaced pair of panels;
- a plurality of electrically interconnected connectors mounted on opposite ones of said panels; and
- a housing having a front and a rear opening, said panels being separately mounted at the front and rear openings, so that said module is readily adapted to the portable computer by selecting a mounting pattern for the connectors on at least one of said panels without modifying said housing, the connectors being electrically interconnected in pairs separately mounted on opposite sides of said housing.

38. A docking module according to claim 37 wherein said housing comprises:
- a pair of complementary shells embracing said panels.

39. A docking module according to claim 38 wherein at least one of said shells has a groove for holding at least one of said panels.

40. A docking module according to claim 38 wherein each of said shells has a spaced pair of grooves for holding different ones of said panels.

41. A docking module according to claim 38 wherein said panels have a plurality of holes, said connectors being mounted in registry with said holes, said module comprising:
- at least one spacer mounted in registry with one of said holes between one of said panels and a prominent one of said connectors, so that connections can be made in recesses of the portable computer.

42. A docking module according to claim 37 wherein said panels each comprise:
- a plate bored with a plurality of holes, said connectors being mounted in registry with said holes.

43. A docking module according to claim 37 wherein said housing comprises:
- a stamped base with at least one side wall.

44. A docking module for electrically connecting a portable computer to a plurality of ancillary support devices, comprising:
- a housing;
- a plurality of electrically interconnected connectors mounted on opposite sides of said housing; and
- engagement means for alternatively pulling and pushing said portable computer relative to said housing, said engagement means including:
  - (a) a transverse member mounted to reciprocate in said housing; and
  - (b) a spaced pair of implements mounted on opposite ends of said transverse member and positioned and sized to project through said housing in order to engage said portable computer, said implements being detachably secured to said transverse member, each of said implements having a bar with a distal catch for hooking into the portable computer.

45. A docking module for electrically connecting a portable computer to a plurality of ancillary support devices, comprising:
- a housing;
- a plurality of electrically interconnected connectors mounted on opposite sides of said housing; and
- engagement means for alternatively pulling and pushing said portable computer relative to said housing wherein, said engagement means including:
  - (a) a transverse member mounted to reciprocate in said housing,
  - (b) subjacent means projecting from said housing and adapted to underlie and pull said portable computer toward said housing,
  - (c) a spaced pair of implements mounted on opposite ends of said transverse member and positioned and sized to project through said housing in order to push said portable computer, and
  - (d) drive means coupled to said implements and said subjacent means for reciprocating said implements and said subjacent means, said drive means having a cam rotatably mounted in said housing for reciprocating said transverse member, said cam having a spaced pair of camming surfaces, one for reciprocating said subjacent means, the other for reciprocating said implements.

46. A docking module for electrically connecting a portable computer to a plurality of ancillary support devices, comprising:
- a housing having a pair of complementary shells with a front and a rear opening;

a pair of panels separately mounted at the front and rear openings of said housing, said complementary shells embracing said panels;

a plurality of electrically interconnected connectors mounted on opposite sides of said housing, so that said module is readily adapted to the portable computer by selecting a mounting pattern for the connectors on at least one of said panels without modifying said housing; and engagement means for alternatively pulling and pushing said portable computer relative to said housing, said engagement means including a subjacent means projecting from said housing and adapted to underlie and pull said portable computer toward said housing.

47. A docking module for electrically connecting a portable computer to a plurality of ancillary support devices, comprising:

a housing having a front portal, a plurality of electrically interconnected connectors mounted on opposite sides of said housing; and subjacent means projecting from said housing and adapted to underlie and pull said portable computer toward said housing, said subjacent means including:
 (a) a sliding deck adapted to underlie and engage said portable computer,
 (b) a hinge member hinged to said sliding deck to allow said deck to swing upwardly in the absence of said portable computer to reduce area occupied by said module, and
 (c) drive means for reciprocating said sliding deck, said sliding deck connecting through said front portal to said drive means.

* * * * *